US009454859B2

(12) United States Patent
Roth (10) Patent No.: US 9,454,859 B2
(45) Date of Patent: Sep. 27, 2016

(54) BEHAVIOR MODIFICATION APPARATUS AND METHOD OF USE THEREOF (71) Applicant: Michael D. Roth, Scottsdale, AZ (US)

(72) Inventor: Michael D. Roth, Scottsdale, AZ (US)

(*) Notice: Subject to any disclaimer, the term of this patent is extended or adjusted under 35 U.S.C. 154(b) by 0 days.

(21) Appl. No.: 14/078,112

(22) Filed: Nov. 12, 2013

(65) Prior Publication Data

US 2015/0130611 A1 May 14, 2015

Related U.S. Application Data (63) Continuation-in-part of application No. 13/295,907, filed on Nov. 14, 2011, now Pat. No. 8,760,299, which is a continuation-in-part of application No. 12/390,995, filed on Feb. 23, 2009, now Pat. No. 8,059,003, application No. 14/078,112, which is a continuation-in-part of application No. 13/942,403, filed on Jul. 15, 2013.

(60) Provisional application No. 61/672,229, filed on Jul. 16, 2012, provisional application No. 61/746,439, filed on Dec. 27, 2012, provisional application No. 61/727,592, filed on Nov. 16, 2012.

(51) Int. Cl.
*G08B 1/08* (2006.01)
*G07C 9/00* (2006.01)
*B60K 28/06* (2006.01)
*G07C 5/02* (2006.01)
*G08B 21/22* (2006.01)

(52) U.S. Cl.
CPC ......... *G07C 9/00111* (2013.01); *B60K 28/063* (2013.01); *G07C 5/02* (2013.01); *G08B 21/22* (2013.01)

(58) Field of Classification Search
CPC .................................................. B60K 28/063
USPC .............................. 340/539.13, 573.1, 573.4
See application file for complete search history.

(56) References Cited

U.S. PATENT DOCUMENTS

| | | | |
|---|---|---|---|
| 4,952,928 A | 8/1990 | Carroll et al. | |
| 5,266,944 A * | 11/1993 | Carroll et al. | 340/573.4 |
| 6,054,928 A * | 4/2000 | Lemelson et al. | 340/573.4 |
| 6,323,566 B1 | 11/2001 | Meier | |
| 6,748,792 B1 * | 6/2004 | Freund et al. | 73/23.3 |
| 6,952,161 B1 | 10/2005 | Williams | |
| 7,003,792 B1 | 2/2006 | Yuen | |
| 7,249,182 B1 | 7/2007 | Heinonen et al. | |

(Continued)

OTHER PUBLICATIONS

Federal Rules of Evidence 902(7), 2015, available at http://federalevidence.com/downloads/rules.of.evidence.pdf, accessed Apr. 28-29, 2015.

*Primary Examiner* — Eric M Blount
(74) *Attorney, Agent, or Firm* — Kevin Hazen (57) ABSTRACT The invention comprises a personal tracking system that identifies an individual, tracks achievements and/or failures of the individual, reports the achievements and/or failures to an authority within an authority system, and provides rewards for the achievements and/or provides punishments for the failures. In one example, the identification system is a personal identification bracelet used as part of an ignition interlock breathalyzer system. Generally, any information associated with the personal identification device and/or the peripheral tracking/monitoring device is maintained in a secure format warranting true information, which is usable in a legal setting, in a training program, or as part of a reward/punishment system.

15 Claims, 6 Drawing Sheets

(56) References Cited

U.S. PATENT DOCUMENTS

| | | | |
|---|---|---|---|
| 7,522,060 B1* | 4/2009 | Tumperi et al. | 340/573.4 |
| 7,616,110 B2 | 11/2009 | Crump et al. | |
| 8,055,509 B1* | 11/2011 | Walker et al. | 705/2 |
| 8,059,003 B2 | 11/2011 | Roth | |
| 8,095,193 B2* | 1/2012 | Ridder et al. | 600/310 |
| 8,280,436 B2* | 10/2012 | Harris, Jr. | 455/556.1 |
| 2002/0070865 A1 | 6/2002 | Lancos et al. | |
| 2003/0023638 A1 | 1/2003 | Weight | |
| 2003/0095046 A1 | 5/2003 | Borugian | |
| 2004/0064415 A1 | 4/2004 | Abdallah et al. | |
| 2004/0094622 A1 | 5/2004 | Vismara | |
| 2005/0040944 A1 | 2/2005 | Contestabile | |
| 2006/0202842 A1* | 9/2006 | Sofer | 340/576 |
| 2006/0232429 A1 | 10/2006 | Gonzalez | |
| 2007/0023496 A1 | 2/2007 | Hall | |
| 2007/0028162 A1 | 2/2007 | Griffin et al. | |
| 2007/0163308 A1 | 7/2007 | Piane | |
| 2007/0239992 A1* | 10/2007 | White et al. | 713/186 |
| 2007/0273537 A1* | 11/2007 | Crespo et al. | 340/576 |
| 2008/0184272 A1 | 7/2008 | Brownewell | |
| 2008/0218335 A1 | 9/2008 | Attar | |
| 2008/0291011 A1 | 11/2008 | Knight | |
| 2009/0146813 A1 | 6/2009 | Nuno | |
| 2011/0309932 A1* | 12/2011 | Arringdale et al. | 340/539.14 |
| 2012/0005224 A1 | 1/2012 | Ahrens et al. | |
| 2012/0115506 A1 | 5/2012 | Bentley | |
| 2012/0221189 A1 | 8/2012 | Konet et al. | |
| 2012/0268259 A1 | 10/2012 | Igel et al. | |
| 2013/0021153 A1 | 1/2013 | Keays | |
| 2013/0031074 A1 | 1/2013 | Vartanian et al. | |
| 2013/0346545 A1 | 12/2013 | Petersen et al. | |

* cited by examiner

BEHAVIOR MODIFICATION APPARATUS AND METHOD OF USE THEREOF

CROSS-REFERENCE TO RELATED APPLICATION

This application:

is a continuation-in-part if U.S. patent application Ser. No. 13/942,403, filed Jul. 15, 2013, which claims the benefit of U.S. provisional patent application No. 61/672,229 filed Jul. 16, 2012 and claims the benefit of U.S. provisional patent application No. 61/746,439 filed Dec. 27, 2012;

is a continuation-in-part of U.S. patent application Ser. No. 14/010,403 filed Aug. 26, 2013; and claims the benefit of U.S. provisional patent application No. 61/727,592 filed Nov. 16, 2012, all of which are incorporated herein in their entirety by this reference thereto.

TECHNICAL FIELD OF THE INVENTION

The present invention relates to a behavior modification reward/punishment system.

DESCRIPTION OF THE RELATED ART

Behavior modification systems have historically been used by people, such as psychiatrists, detention officers, family, and friends. However, improper behavior continues, such as breaking legal orders, behaving improperly in an authority role, arriving to work in a state of impairment, and/or driving under the influence.

Problem Statement

What is needed is a readily implemented and effective reward/punishment system.

SUMMARY OF THE INVENTION

The invention comprises a personal tracking system using a combination of an identification system, an achievement tracking system, an authority system, and a reward/punishment system.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE PREFERRED EMBODIMENTS

The invention comprises a personal tracking system.

In one embodiment, the personal tracking system identifies an individual, tracks achievements and/or failures of the individual, reports the achievements and/or failures to an authority within an authority system, and provides rewards for the achievements and/or provides punishments for the failures.

In one example, the identification system is a personal identification bracelet used as part of an ignition interlock system. Sensor data related to subject metabolic state, driving history, and/or subject global position relative to set boundaries are reported to the authority system. One or more authorities within the authority system use the communicated sensor data in the disposition of rewards and/or punishments to the subject. Examples of tracked behavior include, but are not limited to:

results of blood alcohol tests;
results of breath alcohol tests;
results of drug tests;
global position as a function of time;
  a position relative to a court ordered boundary or zone;
driving performance;
personal communications;
personal aid to others;
training;
earned education credit; and
medical state.

In another example, a personal identification device communicates with a peripheral device, such as directly and/or through a communication device. For example, a personal identification device is coupled with an ignition interlock device. For instance, a wearable personal identification device communicates with an interlock system either via direct communication with a vehicle processor or via an external accessory, such as via use of any of: a cell phone, a tablet computer, a computer network, and/or a personal computer. The identification device is used to identify the individual and the peripheral device tracks performance and/or behavior of the individual. The identification of an individual and the linked performance and/or behavior are sent to an external system where the information is used in the administration of rewards and/or punishments to the individual.

In yet another embodiment, the personal identification device is paired with a system of recording and communicating secure transactional stamps for use in producing a secure report admissible under the Federal Rules of Evidence.

In still yet another embodiment, a series of devices record/transmit true and accurate data in a secure manner usable with an established system, such as a legal system or a medical system.

In yet still another embodiment, the personal identification device communicates biomedical information from the bracelet and/or biomedical information from a peripheral device reliant in part on the presence of the personal identification device to a remote system in a quality assured and/or quality controlled manner.

In yet another embodiment, the peripheral device communicates with an external computer system or person, such as a police network, a regulatory network, a medical network, a supervisor, and/or a parent or guardian. For example, information related to the peripheral device, reliant in part on the presence of the personal identification device, is communicated with the remote system.

Personal Tracking System

Figure 1:
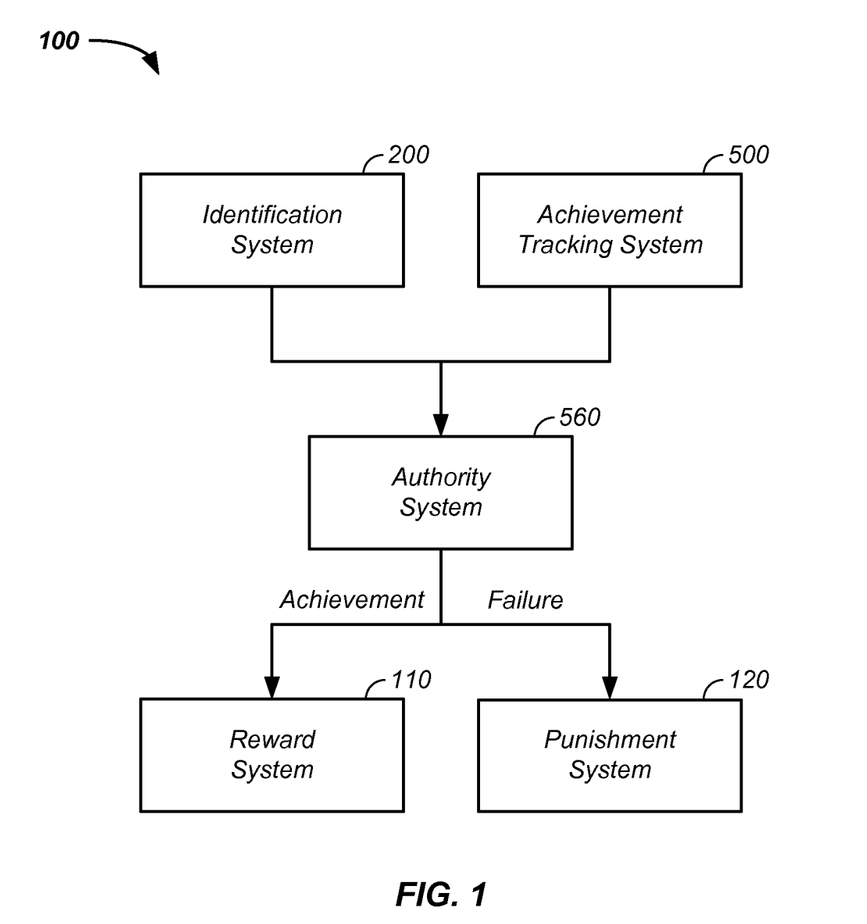
FIG. 1 illustrates a personal tracking system.

Referring now to FIG. 1, a personal tracking system 100 is illustrated. Generally, the personal tracking system 100 uses an identification system 200 to identify an individual or subject and an achievement tracking system 500 to track achievements, failures, metabolic state, blood alcohol concentration, illicit drug concentration, behavior, actions, and/or position of the individual. Output of the achievement tracking system 500, which is linked to an individual, is reported to an authority system 560. One or more authorities associated with the authority system 560 then provide the individual with rewards using a reward system 110 for their personal achievements and/or provide the individual with punishments via a punishment system 120 for their personal failures. The achievement tracking system and/or the authority system are preferably manifested as computer code and via use of a dynamic database in one or more linked computer systems. Each of the identification system 200, achievement tracking system 500, authority system 560, reward system 110, and punishment system 120 are further described, infra.

Identification System

Figure 2:
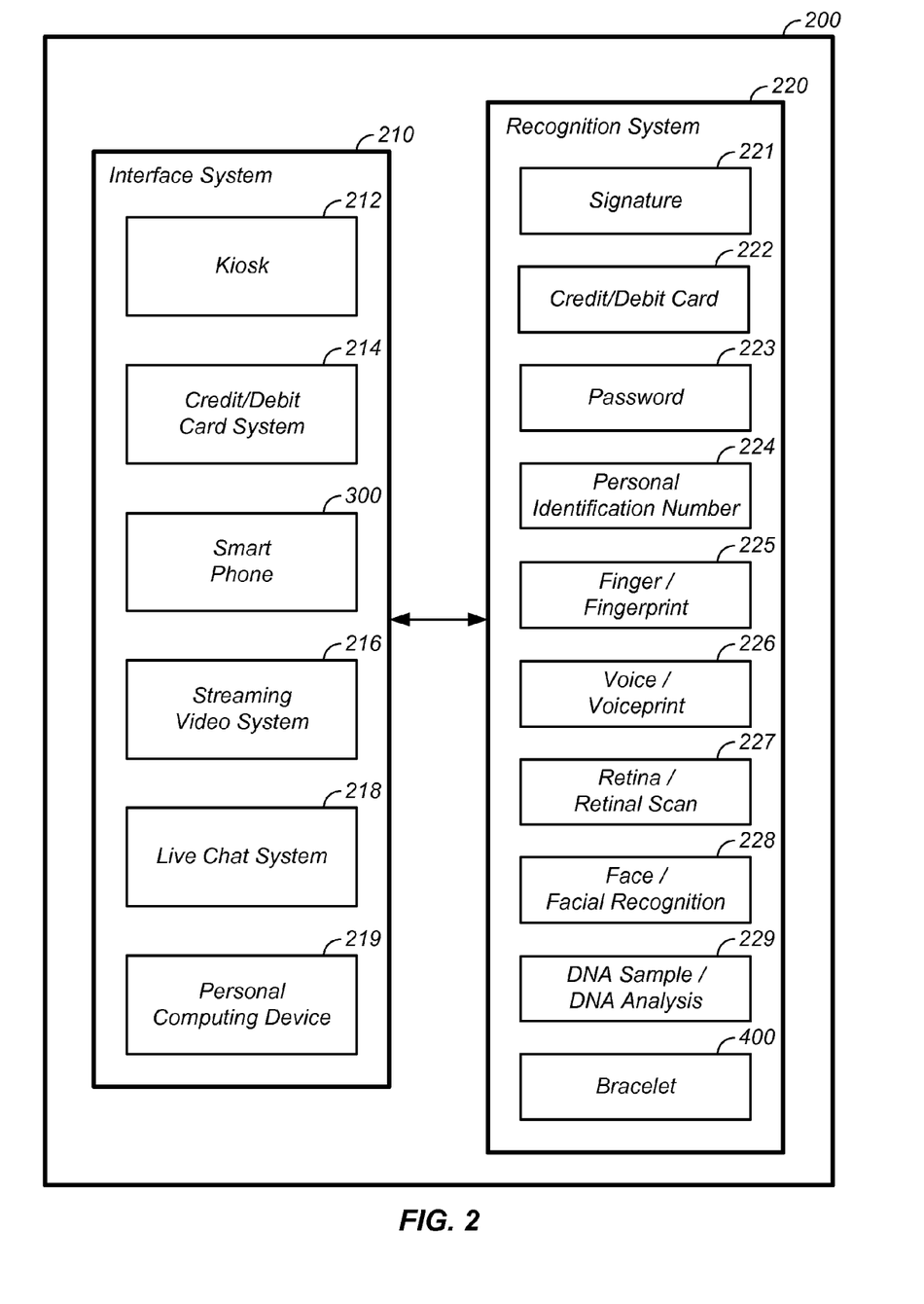
FIG. 2 illustrates an identification system.

Referring now to FIG. 2, the identification system 200 is further described. Generally, the identification system 200 uses any means for determining the identification of an individual. Herein, for clarity of presentation and without loss of generality, the identification system 200 is described using an interface system 210 and/or a recognition system 220. Generally, the individual interacts with the interface system 210 and provides evidence of identity using the recognition system 220. Generally, any of the optional recognition system 220 identification processes are used in conjunction with any of the optional systems of the interface system 210. The interface system 210 and recognition system 220 are further described, infra.

Interface System

Still referring to FIG. 2, the interface system 210 that the individual physically interacts with is further described. Generally, the interface system is any physical device that is used to interact with the individual. Examples of interface systems 210 include, but are not limited to, one or more of: a kiosk 212, a credit and/or debit card system 214 or reader, a smart phone 300, a streaming video system 216, a personal computing device 219, and/or a live chat system 218, such as with an authority figure, authorization grantor, and/or a person visually confirming a task such as an alcohol test of an individual.

Recognition System

Still referring to FIG. 2, the recognition system 220 is used to acquire personal identification information that identifies the particular individual. Examples of personal identification information provided by the individual include, but are not limited to: a signature 221, a credit and/or a debit card 222, a password 223, a personal identification number 224 or personal identification code, a fingerprint 225, a voiceprint 226, a retinal scan 227, the individual's face for facial recognition 228, a DNA sample 229, such as a real-time providing of a DNA sample to the kiosk 212, a real-time DNA analysis, a blood sample, an interstitial fluid sample, and/or presence of a personal identification bracelet 400.

Interface/Recognition System Interaction

In a first example, the kiosk 212 is used to identify the individual at a particular location, such as at a bar, nightclub, and/or at a security checkpoint. The kiosk 212 is optionally configured with one or more sensors and/or systems to perform any chemical and/or physical test. Examples of chemical tests/chemical testing systems include, but are not limited to: a blood alcohol monitor, a drug monitor, a DNA monitor, and/or a system used to accept and/or use any recognition system 220 element, such as the DNA sample 229. Examples of a physical test/physical testing system include, but are not limited to: analysis of the signature 221, fingerprint 225, voiceprint 226, retina 227, face 228, or DNA sample 229.

In a second example, the smart phone 300 and/or a personal computing device 219 uses a camera and/or a text system to implement the streaming video system 216 and/or the live chat system 218, respectively. In a first case of the streaming video system 216, the face 228 and/or retina 227 is used to identify the individual. In a second case, the live chat system 218 is used to identify the individual through use of the password 223, the personal identification number 224, and/or through a real-time interaction with a person, representing an authority system, where the person has power to grant authority, where information such as a personal history, environmental information, mother's maiden name, and/or the password 223 are provided to identify the individual.

Figure 3:
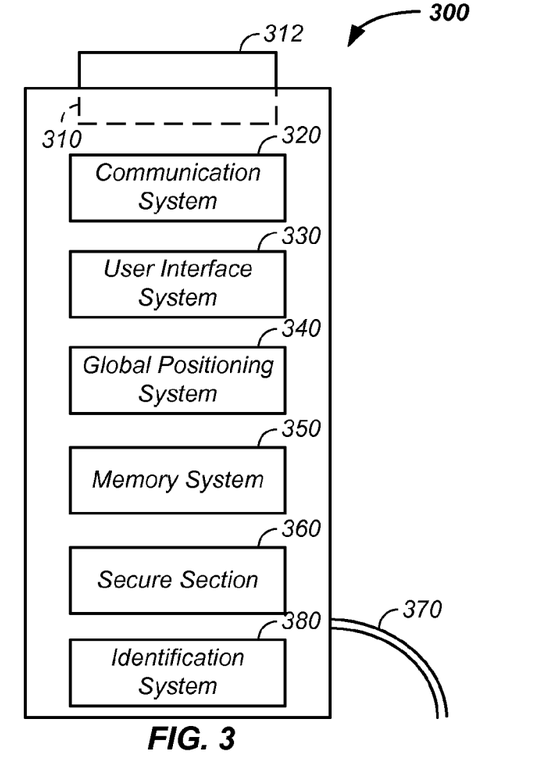
FIG. 3 illustrates a personal communication system.

Referring now to FIG. 3, in a third example, functionality of the smart phone 300 is optionally used as part of the personal identification system 200. Use of the smart phone 300 as part of the personal identification system 200 is further described, infra.

Figure 4:
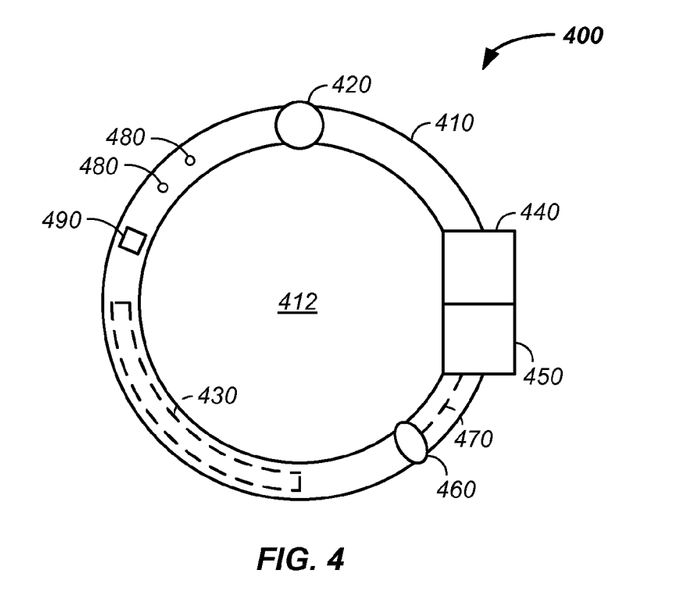
FIG. 4 illustrates an identification bracelet.

Referring now to FIG. 4, in a fourth example, the bracelet 400, such as a personal identification bracelet is optionally used as part of the personal identification system 200. Use of the bracelet 400 as part of the personal identification system 200 is further described, infra.

In a fifth example, the smart phone 300 and/or the personal computing device 219 are used to confirm and/or communicate proximity of the bracelet 400 to a system, such as an auxiliary system, a peripheral system, and/or an ignition interlock system.

In a sixth example, functionality of any element of the interface system 210, such as a global positioning system (GPS), vehicle ignition interlock system, drug monitoring system, and/or health monitoring system are associated with the individual using any element of the recognition system 220.

In a seventh example, output of the interface system 210 and/or recognition system 220 is communicated to an external system, such as: the authority system 560, a medical system, an emergency system, a support network, a family member, an employer, a friend, and/or a ticket collecting kiosk at a sports or music venue where the ticket is an identification of the individual, where the kiosk confirms that individual has a ticket to the event.

Generally, any computer code/data analysis system is optionally used in any of the interface systems 210 to recognize, confirm, and/or reject any of the recognition system 220 samples.

Smartphone

Referring now to FIG. 3, as described, supra, the personal tracking system 100 optionally uses a smartphone 300. The smartphone 300 herein also refers to a feature phone, a mobile phone, a portable phone, and/or a cell phone. More generally, for clarity of presentation the smartphone 300 is optionally any personal computing device 219, such as a phone, tablet, or a phablet. The smartphone 300 contains a number of hardware and software features, which are optionally usable in combination with the personal tracking system 100 and/or with the bracelet 400, such as a hardware port 310, a communication system 320, a user interface system 330, a global positioning system 340, a memory system 350, a secure section 360, an identification system 380, and/or a power inlet 370 or power supply.

The hardware port 310 of the smartphone 300 typically contains one or more electro-mechanical connectors designed to physically link to an external hardware element. Examples of connectors include a power supply port, a universal serial bus (USB) port, an audio port, a video port, a data port, a port for a memory card, and a multi-pin connector, such as a 30-pin connector on a n-pin connector where n is a positive integer.

In one embodiment, one or more of the hardware ports 310 physically interface to a bracelet receiver 312. The bracelet receiver 312 optionally wirelessly interfaces the bracelet 400 to the smart phone 300. For example, the bracelet receiver 312 receives input from the bracelet 400 or wireless communication device 430 of the bracelet. In a particular example, the wireless communication device 430 is a radio-frequency identification tag (RFID), which transmits signal over a limited distance, such as in the centimeters to many meters range. Generally, the distance of communication is a function of frequency, with lower frequencies of communication being in the kiloHertz range that transmit for centimeters and the higher frequency gigaHertz range transmitting for hundreds of meters. Herein, for use of confirming that an individual 412 is proximate the smartphone 300, the preferred frequency of the wireless communication is in the 5 to 7000 megaHertz range, which transmits the signal from 1 to 100 meters or a lower frequency range transmitting from 10 to 100 centimeters.

The bracelet receiver 312 is optionally produced for law enforcement. As such, the bracelet receiver 312 optionally contains a number of features associated with tracking the individual 312, such as recognition of being removed and replaced from the smartphone 300, secure programming or code, and/or a law enforcement programmable chip.

Each of the communication system 320, user interface system 330, global positioning system 340, and/or memory 350 of the smartphone 300 is optionally used as part of the personal tracking system 100. In a first example, the individual 412 uses the smartphone 300 to call the authority system 560 to report location of the individual 412, using the communication system 320, user interface system 330, and/or global positioning system 340, where the smartphone 300 is used to confirm identity of the individual 412 through the smartphone 300/bracelet 400 localized communication system. In a second example, the smartphone 300 notes position of the individual 412 as a function of time and records the position information in the memory system 350 or transmits the location in real or delayed time to the authority system 560. In a third example, the cell phone automatically communicates position of the individual 412 to the authority system 560 without interaction of the individual 412.

The secure section 360 of the smartphone 300 is used to impede tampering by the individual 412, such as impedance of reprogramming any element of the identification/peripheral device.

The optional identification system 380 of the smartphone 300 is used as a primary identification of the individual 412 or preferably as a secondary identification of the individual 412, where the bracelet 400 is the primary identification of the individual 412. Examples of use of the smartphone 300 for identification of the individual 412 include use of video of the individual 412, a photo of the individual 412, a scan of the iris or retina 227 of the individual 412, use of a fingerprint 225 of the individual 412, and/or use of voice recognition 226 of the individual 412 at time of identification along with reference data and a comparison algorithm. Generally any means of identification using the smartphone 300 is optionally used.

The power supply connected to the smartphone 300 is optionally indirectly used to provide power to a passive radio-frequency identification tag embedded in the bracelet 400, where the passive RFID lacks an integrated power supply.

Optionally, any of the features performed using the bracelet receiver 312 are optionally performed using a smartphone 300 application and/or standard feature in combination with internal hardware of the smartphone 300, such as a wireless receiver.

Optionally, one or more features of the smartphone 300 is embedded into the bracelet 400.

Bracelet

Referring now to FIG. 4, the bracelet 400 is illustrated. Generally, the bracelet 400 is worn by a specific individual 412 and is used to identify the presence of the specific individual 412 associated with the bracelet. The bracelet 400 is optionally circular, annular, or is of a geometry that forms an outer perimeter about a body part, as described herein.

The bracelet 400 is removable, is removable only with destructive force, or is removable with use of a form of a key. In the first case, the bracelet is removable and is used to determine proximity of an individual 412. The presence of the individual 412 is used to facilitate an action. For example, as the individual 412 is walking up to the individual's vehicle, the bracelet communicates the presence of the individual 412 to the vehicle and the vehicle is automatically unlocked and/or started based on the presence of the individual. In the second case, the bracelet is not readily removable, but the bracelet is still used to identify presence of the individual 412 to a communication device and/or a peripheral device. The not readily removed bracelet includes one or more of: a security ring 410 or loop, a security mechanism 420, a wireless communication device 430, a power supply 440, a communication system 450, a motion charged power supply 460, an internal wire 470 or wire bundle, an indicator light 480, and a motion sensor 490.

The security ring 410, security band, annular device, loop, or structure circumferentially surrounds a body part of the individual during use in a manner where, along a given plane crossing axially through the individual's body part, an inner perimeter distance or diameter of the security ring is smaller than an outer perimeter distance or outer diameter of an extension of the body part along a longitudinal axis perpendicular to the axial axis on both a first longitudinal side of the bracelet 400 and on a second longitudinal side of the bracelet 400. The security ring 410 is preferably formed of a rigid material, such as steel, stainless steel, a hardened material, and/or material difficult to cut, remove, or alter. Optionally the security ring 410 is only removable from the individual via opening a lock and/or through the use of destructive force.

The optional security mechanism 420, such as a lock, crimp, or seal, is used to affix the security ring 410 about the body part of the individual 412 in a manner that is not readily removable without breaking or altering of the security mechanism 420. The seal on the security mechanism 420 optionally forms a two or three dimensional mark using a softer material than the security ring 410, where the unaltered mark represents a non-tampered seal and/or an authority symbol, such as from a police or legal system. For example, the security ring 410 is crimped at the security mechanism 420 to form a continuous loop about the body part of the individual 412. Optionally, the crimping mechanism is engraved so as to form the mark on the bracelet 400 when the crimping of the bracelet 400 is performed.

The wireless communication device 430 is optionally a radio-frequency identification system or tag. The radio-frequency identification tag is optionally powered by a battery electrically connected to the radio-frequency identification tag or is powered by an electromagnetic field used to read the radio-frequency identification tag.

The optional power supply 440, such as a battery, is optionally embedded within the bracelet 400, is semi-embedded into the bracelet 400, is attached to the bracelet 400, or is replaceable affixed to the bracelet 400.

The optional communication system 450 is any device used to digitally identify the presence of the bracelet 400 and hence the specific individual to an outside digital system and/or to the authority system 560, where the communication system 450 is not the radio-frequency identification tag.

The optional motion charged power supply 460 is used to charge an electrically coupled power consuming device in the bracelet 400, such as the wireless communication device 430, the power supply 440, the communication system 450, and/or a mechanical winding mechanism. Additionally and/or optionally, the motion powered power supply 460 is used to run a current or a voltage through the internal wire 470, where cutting the internal wire 470 results in an electrical short causing the bracelet 400 to refuse to identify the presence of the individual 412 to the peripheral device and/or to contact an authority person or the authority system 560.

The optional indicator(s) 480, which are electrically and logically connected to a power supply and logic unit, are used to inform the individual 412 that the bracelet 400 is any of: on, off, transmitting, receiving, within range of a vehicle, within an acceptable boundary, outside an acceptable boundary, inside a court ordered boundary, outside of a court ordered boundary, in communication with the authority system 560, in range of the authority system 560, out of range of the authority system 560, functioning, and/or malfunctioning.

The optional motion sensor 490, detects motion along the x-, y-, and/or z-axes. The motion sensor 490 uses the detected motion to determine shake of the individual 412. Shake of the individual is optionally used to determine alcohol impairment of the individual 412, an epileptic seizure of the patient 412, and/or to indicate that the patient 412 was just in an accident. The use of shake of the individual 412 is an example of a secondary test or auxiliary test of impairment. Optionally, the motion sensor 490 is placed into the smartphone 300.

Achievement Tracking System

Figure 5:
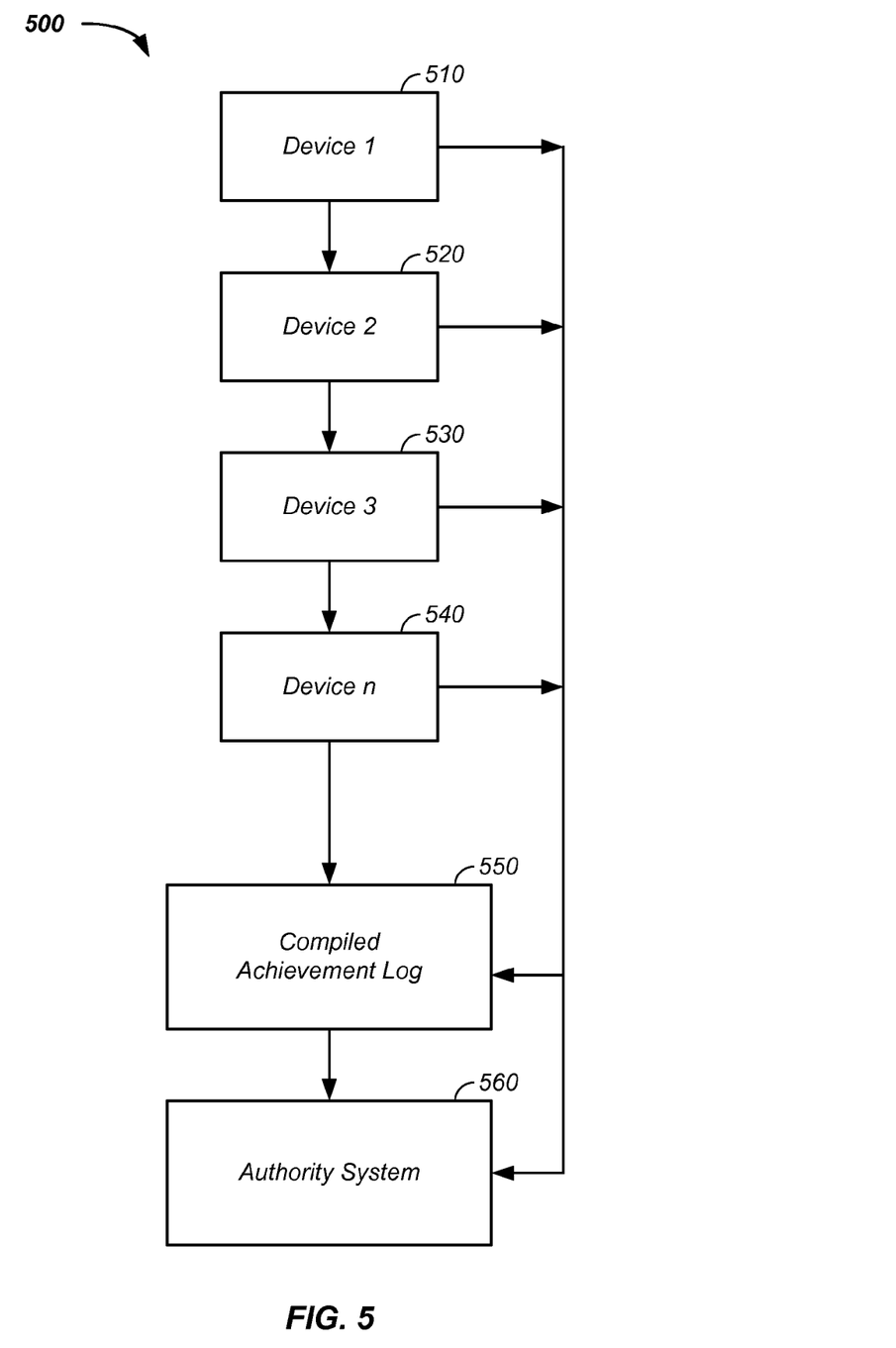
FIG. 5 illustrates one or more devices generating an achievement log.

Referring again to FIG. 1 and now to FIG. 5, the achievement tracking system 500 is further described. Generally, one or more devices produce one or more achievement logs. The achievement logs are optionally in the form of digital certificates. For clarity of presentation and without loss of generality, the devices are described as recording achievements, where the achievements are optionally failures, achievement/failure logs, and/or achievement/failure digital certificates linked to the individual 412, such as through use of the bracelet 400.

Referring now to FIG. 5, as illustrated, a first device 510 generates a first achievement certificate, which is communicated to a second device 520, to a compiled achievement log 550, and/or to the authority system 560. The second device 520 optionally generates a second achievement certificate and/or securely amends the first achievement certificate to the second achievement certificate. Similarly, a third device 530 optionally generates a third achievement certificate and/or securely amends the first or second achievement certificate. The process of producing and/or amending achievement certificates is optionally repeated n times, such as with an $n^{th}$ device 540, where n is a positive integer. Hereinafter, the generated and/or amended achievement certificates are also referred to as a certificate. Preferably, each of the devices 510, 520, 530, 540 records information in the corresponding certificate that the device can confirm. Generally, the compiled evidence log 550 is a concatenation, combination, and/or summary of the underlying certificates, where information in the compiled evidence log 550 represents a secure chain of evidence. The compiled evidence log 550 is optionally used by the authority system 560, such as in a legal proceeding, in the administration of rewards, and/or in the administration of punishments.

Vehicle Ignition System

Herein, for clarity of presentation and without loss of generality, a vehicle ignition interlock system is used as an example of part of an achievement tracking system 500. Herein, a vehicle ignition system includes any element of a vehicle used to start the vehicle. Herein, the vehicle comprises any system used to transport the individual 412 under the control of the individual 412, such as a car, truck, motorcycle, motor powered transporter, engine powered transporter, hybrid vehicle, boat, airplane, or the like.

Figure 6:
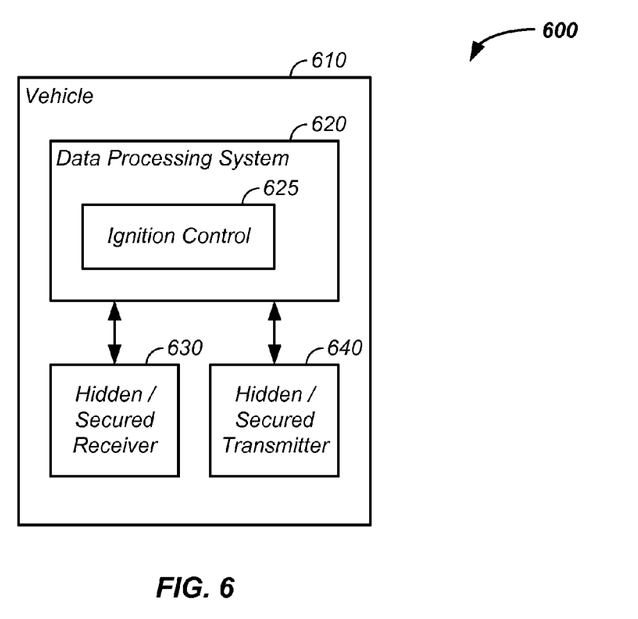
FIG. 6 illustrates a vehicle ignition system.

Referring now to FIG. 6, a vehicle ignition system 600 is illustrated. The vehicle 610 is optionally configured with one or more of: a data processing system 620, an ignition control 625, a hidden/secured receiver 630, a hidden/secured transmitter 640, and/or through use of a transceiver. For example, the hidden/secured receiver 630 receives a signal from the bracelet 400, which indicates proximity of the individual 412 wearing the bracelet 400. The signal is electronically, wirelessly, and/or digitally communicated to the data processing system 620, which is optionally a computer in the vehicle 610 as originally produced by the vehicle's manufacturer. The signal, originating from the bracelet 400, is used in a process of starting the vehicle 610. For instance, the RFID tag indicates that the individual's bracelet is less than 10, 20, 30, 40, 50, 75, 100, 150, or 200 centimeters from a breathalyzer. For instance, the RFID tag of the bracelet is designed with a low frequency transmitter requiring the individual's hand to be within twenty centimeters of the breathalyzer hardware, which optionally contains a receiver to identify the bracelet. This low distance signal transmitter hinders starting of the vehicle using breathalyzer data collected from a second person, such as a non-drinking friend. In this example, the starting of the vehicle or result of the breathalyzer is optionally reported back to the smartphone 300 using the hidden/secured transmitter 640. For instance, the pass or failure of a blood alcohol concentration is logged in the compiled achievement log 550 and sent to the authority system 560. A passed blood alcohol test is an achievement, a failed blood alcohol test coupled with the attempt to drive is a failure. A DNA test is optionally run on fluids collected during the breathalyzer test to confirm identity of the user.

Bracelet/Vehicle Interlock

Herein, without limitation and for clarity of presentation, a bracelet is used as an example of a personal identification system 200 device and a vehicle 610 is used as an example of a peripheral achievement tracking system 500 device. The bracelet 400 identifies an individual 412 to a vehicle ignition system of the vehicle 610 and is used to verify the individual in records, in chain of custody records, and/or as part of a process of starting the vehicle 610. In this example, the bracelet 400 is worn by the individual 412. The bracelet 400 identifies the individual and warrants the presence of the particular individual. Generally, the bracelet 400 is used in combination with any known breathalyzer hardware and/or software. Further, the bracelet 400 is in direct and/or indirect communication with a vehicle ignition system. For example, the communication between the bracelet 400 and vehicle ignition system uses any of the communication apparatus described, supra. In this example, passing or failing a blood alcohol test using the ignition interlock system is recorded as an achievement or failure, respectively, in the compiled achievement log 550 sent to the authority system 560. More generally, a pass or failure recorded by a peripheral achievement tracking system 500 device is recorded as an achievement or failure, which is transmitted to the authority system 560.

Digital Certificate

In a non-limiting/specific example, the bracelet 400 is used to identify the particular individual and to confirm presence of the individual to a smartphone 300, where the confirmation optionally takes the form of a digital certificate. Optionally, the digital certificate is write protected, encrypted, or otherwise secured. The smartphone is used to relay presence of the individual to a vehicle computer linked to the vehicle ignition system or directly to the vehicle ignition system, again optionally with the use of another digital certificate. Similarly, the vehicle ignition system optionally forms yet another digital certificate. The digital certificate records achievements and/or failures of the individual 412, such as:

- a blood alcohol test result;
- a controlled substance test result;
- driving history/habit/performance as measured by a tracking system of the vehicle 610;
    - sudden starts stops, and/or swerves of the vehicle as monitored by the vehicle 610;
- shaking of the individual 412 as measured by an accelerometer, which is indicative of a seizure or blood alcohol impairment;
- a global position relative to a controlled zone, court ordered zone, or virtual fence;
- a global position relative to a restricted zone, such as a school;
- a kiosk test result, such as for an airline pilot, a heavy machinery operator, a teacher, a court official, or a police officer; and/or
- a military checkpoint sensor.

The digital certificate or compiled achievement log 550 is provided to the authority system 560.

Authority System

Referring again to FIG. 1, the authority system 560 is optionally any system authorized to administer rewards for achievements and/or to administer punishments for failures. For example, a legal system, court, judge, parole officer, probation officer, correctional officer, administrator, parole board, juvenile delinquency officer, court appointed administrator, and/or authorized individual or group optionally uses the compiled evidence log 550 in the determination and/or administration of one or more rewards for achievements recorded in the evidence log and/or in the determination and/or administration of one or more punishments for failures recorded in the evidence log. The reward system 110 and/or the punishment system 120 are optionally codified and/or are at the limited discretion of the authority of the authority system 560.

Several examples of identifying an individual, recording of achievements and/or failures linked to the individual, and reporting the achievements and/or failures to the authority system 560 are provided, infra.

Example I

Identification Device/Peripheral Device Communication

Referring again to FIG. 1, the personal tracking system 100 uses an identification system 200 at least intermittently in communication with the achievement tracking system 500, which is also referred to as a peripheral device. In a first case, the identification system 200 directly communicates with the achievement tracking system 500. In one example, the identification system 200 uses integrated communication hardware and/or an integrated power source. In another example, the power source for the identification system 200 is remotely located. In a second case, the communication between the identification system device 200 and the achievement tracking system 500 is indirect, such as through use of any of: a smartphone, a tablet, a personal computer, a wireless network, a network, and/or an external to the bracelet communication system. Examples of achievement tracking systems 500 include, but are not limited to: a car, a vehicle, a phone, a computer, an electronic lock, a door lock, and an electronic device. Any element of the tracking system 500 records behavior and/or state of the individual 412 into the compiled achievement log 560, which is provided to the authority system 560.

Example II

External Monitoring

Figure 7:
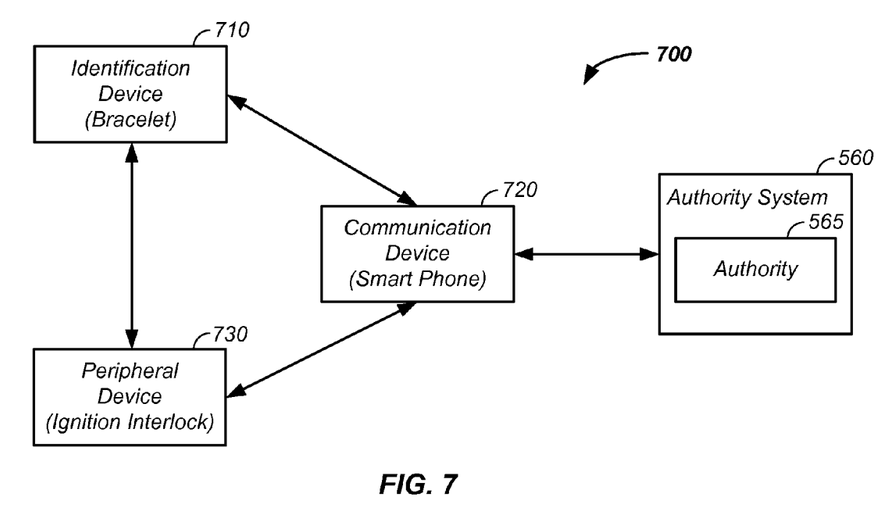
FIG. 7 illustrates interaction of an identification device and a peripheral device with an authority system.

Referring now to FIG. 7, an identification device/peripheral device reporting system 700 is illustrated. Optionally, the identification/peripheral device system 700 uses an identification device 710 and a peripheral device 730.

The identification/peripheral device system 700 communications through a communication device 720 to an external system, such as the authority system 560 or an authority 565 related thereto, a police network, a medical system, and/or a government agency. The authority system 560 is used for any of:

- spot checking position of the individual 412;
- receiving notification of the individual 412 entering and/or departing an approved and/or restricted zone, such as:
    - a route to an approved destination, such as a workplace, a grocery store, and/or a gas station;
    - a legally geographically fenced zone;
    - an approved distance from a location, such as a radius of travel from a home;
    - departure from a property, such as in a home arrest;
    - entry into a restricted destination, such as a playground, school, or bar; and/or
    - departure from a county or state;

monitoring communication status of the communication device 720; and global position tracking of the individual.

The external network, law enforcement network, and/or the authority system 560 is optionally used to transmit data to a law enforcement officer.

Example III

Data Authenticity

Optionally, data gathered by any element of the personal tracking system 100 is recorded, verified, transmitted, and/or securely transmitted in a manner verifying authenticity, such as through use of a digital certificate, an electronic handshake, or through use of a checksum. For example, in the case of the bracelet 400/vehicle ignition system 600 combination, the data authenticity indicates that the specific individual 412 associated with the bracelet 400 is present and that the information transmitted is secure, such as for use in a legal proceeding. The digital certificate(s) and a digital certificate system 700 are described herein. Herein, achievement logs are used as examples of the digital certificates.

Bracelet/Vehicle/Reward Log

Figure 8:
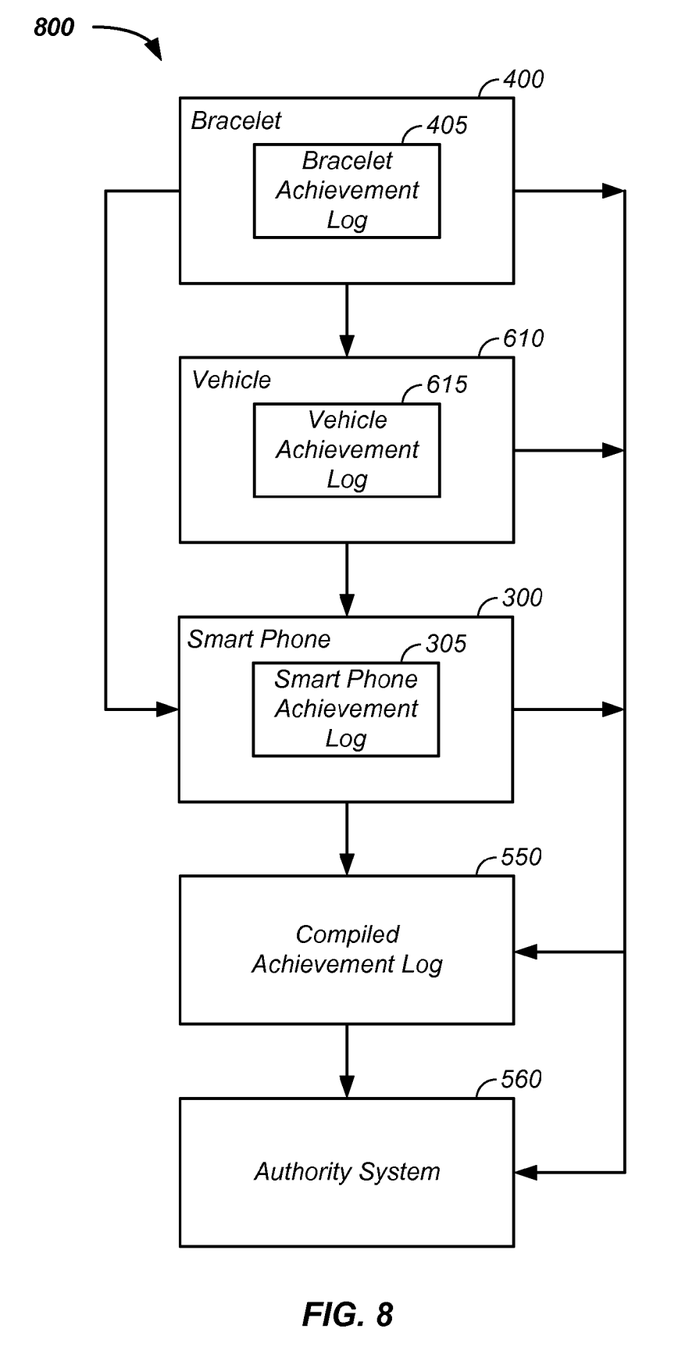
FIG. 8 illustrates a bracelet/vehicle ignition interlock/achievement log.

Referring now to FIG. 8, an example of a bracelet/vehicle digital certificate system 800 is illustrated, which is an example of the personal tracking system 100. In the bracelet/vehicle digital certificate system 800, the bracelet 400, the smart phone 300, and the vehicle 610 are examples of the first device 510, the second device 520, and the third device 530 of the achievement tracking system 500, described supra.

Still referring to FIG. 8, the bracelet 400 produces a bracelet achievement log 405 corresponding to the generic first digital certificate of the first device 510. Examples of information securely recorded into the bracelet evidence log 305 include:

specific identity of an individual wearing the bracelet;
a time stamp of installation of the bracelet about the individual;
a time stamp of breaking of a bracelet security seal;
communications with an auxiliary device;
time stamps of any of the communications with the auxiliary device;
a record of any modified data yielding a secure dataset;
time(s) of proximity to the smart phone 300, such as a start time and stop time;
time(s) of proximity to the vehicle 610, such as a vehicle start time and a vehicle off time; and/or
shaking of the individual 412 as measured by an accelerometer, which is an indication of a seizure or impairment.

Still referring to FIG. 8, the smart phone 300 produces a smart phone achievement log 305 corresponding to the generic second digital certificate of the second device 520. Examples of information securely recorded into the smart phone evidence log 305 include:

times of power interruption;
if data in the phone was altered;
a time stamp of breaking of a phone security seal;
communications with an auxiliary device;
time stamps of any of the communications with the auxiliary device;
a record of any modified data yielding a secure dataset;
time(s) of proximity to the bracelet 400, such as a start time and stop time; and/or
time(s) of proximity to the vehicle 610, such as the vehicle start time and the vehicle off time.

Still referring to FIG. 8, the vehicle 610 produces a vehicle achievement log 615 corresponding to the generic third digital certificate, which is an example of the third device 530. Examples of information securely recorded into the vehicle achievement log 615 include:

an ethanol test result;
a blood alcohol test result;
an ignition interlock test result;
a drug test result;
vehicle start time(s);
drive time(s);
vehicle off time(s);
proximity to bracelet time(s);
vehicle positions as function of time;
verification of true and accurate data;
recordations of any data changes;
times of power interruption;
if data in the vehicle achievement log 615 was altered;
a time stamp of breaking of a vehicle security seal;
communications with an auxiliary device;
time stamps of any of the communications with the auxiliary device;
a record of any modified data yielding a secure dataset;
time(s) of proximity to the bracelet 400, such as a start time and stop time; and/or
time(s) of proximity to the smart phone 300.

A specific example illustrates use of the bracelet 400/bracelet log 405, smart phone 300/smart phone log 305, and vehicle 610/vehicle log 615. The bracelet 400 identifies an individual in the bracelet log 405 and provides the information to the vehicle 610. The vehicle 610 records the identity of the individual 412 in the vehicle log 615 along with vehicle ignition times, off times, drive times, and/or position of the vehicle 610. The vehicle log 615 and/or bracelet log 405 are securely transmitted to the smart phone 300/smart phone log 305 and the smart phone securely relays the combined log information to the external network, supervisor, compiled evidence log, and/or the authority system 560. Generally, the information transmitted represents a secure chain of true and accurate data from the bracelet 400 and vehicle 610 to an end system.

Generally, any of the data recorded in any of the logs is verifiable in terms of time with a time stamp, information in terms of a sensor, data in terms of internal restricted access computer code, and data changes in terms of name of the personnel, and/or via use of a history log in a manner admissible under the Federal Rules of Evidence.

In another embodiment, a retrofit device is used to implement recognition of the bracelet to a car not equipped with bracelet recognition software.

In another embodiment, the bracelet 400 is used to identify the individual 412 for any other purpose, such as to control an auxiliary device, such as an electronic piece of equipment, a stereo element, or volume of a stereo. Similarly, the bracelet 400 is optionally used to identify the individual 412 to a device where the device uses the identification of the individual to set one or more control parameters. Examples of control parameters include: (1) a speed limit control and/or (2) a regulator control or limit. Still further, the identification of the individual 412 via the bracelet 400 is optionally by to auxiliary electronic device used to requirement an action, such as use of a seatbelt, allowed times for the vehicle to run/move, and/or allowed distance of travel.

The personal identification/peripheral device system 700 described, supra, is described as identifying the individual 412 to a peripheral device 730. In another embodiment, the identification device 110 is used as a part of a process of relaying personal data to an external network. For example, a sensor is used to read a body parameter of the individual 412 using the peripheral device 730, such as a wearable personal device or through use of a kiosk, and to relay the data directly and/or through the communication device 720 to the external network or authority system 560, which is optionally a corporation.

In yet another embodiment, a personal identification device, such as the bracelet 400 or an embedded microchip used to identify the person is in communication with an auxiliary device and a remote system. For example, the embedded microchip is in a bracelet, a wearable personal accessory, is implanted in the individual, and/or is in a personal carriable item such as a purse.

In still yet another embodiment, countermeasures are implemented as part of an ignition interlock device. For example, one or more sensors are used to monitor state of the vehicle, such as an open or closed window or electrical drain on a cigarette lighter or auxiliary port. In the case, of an open window, the ignition interlock device puts up the window or fails to operate until the window is put up to avoid another blowing into the machine. In the case of the electrical drain, the interlock device will not operate to avoid an electric pump used to provide air for the breathalyzer. All conditions and results of auxiliary sensor tests are optionally recorded in the compiled achievement log as successes or failures.

In yet still another embodiment, achievements and/or punishments are award for actions of the individual 412, such as:
- an achievement for calling a cab if the breathalyzer yields a failed result;
- a failure for multiple attempts using the breathalyzer after a failed results; and
- a failure for being in a school zone or other area restricted to the individual 412.

In any of the cases provided here, examples of rewards/punishments include, but are not limited to, any of:
- a fine reduction;
- an increased fine;
- removal of a fine;
- a supplemental or new fine;
- a more lenient probation schedule;
- a more stringent probation;
- a request for release from continued probation; and
- a recommendation not to prematurely end a probation period.

In still yet another embodiment, the identification, tracking performance, and reward/punishment system is applied to any personal goal or system, such as a diet, a financial arrangement, a fitness program, a class, and/or a program.

Still yet another embodiment includes any combination and/or permutation of any of the elements of any of the embodiments described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention.

The invention claimed is:

1. A method for tracking personal achievements of an individual, comprising the steps of:
   - using a personal identification system to warrant identity of the individual, said personal identification system comprising a wearable microchip;
   - using an achievement tracking system to track achievements of the individual;
   - an authority system awarding rewards to the individual using output comprising both: (1) warranted identity of the individual transmitted from said personal identification system; and (2) personal achievements of the individual transmitted from said achievement tracking system; and
   - using said achievement tracking system to track behavior of the individual;

using a personal communication device of the individual to relay said output to at least one of said achievement tracking system and said authority system in the form of a secure digital certificate;

wherein said output comprises a compiled history log digitally transmitted in a secure chain of true and accurate data using transaction stamps admissible under the Federal Rules of Evidence, wherein the tracked behavior of the individual comprises at least one of:
education; passed alcohol tests collected as part of use of a vehicle ignition interlock system; and
personal aid to others.

2. The method of claim 1, further comprising the step of:
using a vehicle driven by the individual to track said behavior, said behavior comprising tracking position of the individual's driving location relative to at least one of:
a court ordered geographical zone;
a virtual fence;
an approved route to work;
a restricted location;
departure from a county; and
departure from a state.

3. The method of claim 1, said behavior comprising driving performance as measured through use of at least one of: sudden stops, sudden starts, and sudden swerves as measured by a vehicle driven by the individual.

4. A method for tracking personal achievements of an individual, comprising the steps of:
using a personal identification system to warrant identity of the individual, said personal identification system comprising a wearable microchip;
using an achievement tracking system to track achievements of the individual;
an authority system awarding rewards to the individual using output comprising both: (1) warranted identity of the individual transmitted from said personal identification system; and (2) personal achievements of the individual transmitted from said achievement tracking system; and
using said achievement tracking system to check for impairment of at least one of:
an airline pilot;
a heavy machinery operator;
a police officer; and
a court official,
said achievement tracking system comprising a kiosk testing station; and
using said kiosk to generate a secure digital certificate comprising results of said check for impairment,
wherein said output comprises a compiled history loci digitally transmitted in a secure chain of true and accurate data using transaction stamps admissible under the Federal Rules of Evidence.

5. The method of claim 1, further comprising the step of:
using a personal communication device of the individual to relay output from said personal identification system and said achievement tracking system to said authority system in the form of a secure digital certificate.

6. The method of claim 5, said authority system comprising an authority figure authorized to administer a reward to the individual, said authority figure comprising at least one of:
a parole officer;
a probation officer;
a correctional officer; and
a court appointed administrator.

7. The method of claim 6, said authority figure granting a reward of at least one of:
a reduced fine; and
removal of a fine.

8. The method of claim 1, further comprising the step of:
combining use of said achievement tracking system with a vehicle ignition system, said vehicle ignition system providing to said achievement tracking system a summary of driving performance of the individual.

9. A method for tracking personal achievements of an individual, comprising the steps of:
using a personal identification system to warrant identity of the individual, said personal identification system comprising a wearable microchip;
using an achievement tracking system to track achievements of the individual;
an authority system awarding rewards to the individual using output comprising both: (1) warranted identity of the individual transmitted from said personal identification system; and (2) personal achievements of the individual transmitted from said achievement tracking system; and
using output from said wearable microchip in setting a velocity regulator control of a vehicle,
wherein said output comprises a compiled history loci digitally transmitted in a secure chain of true and accurate data using transaction stamps admissible under the Federal Rules of Evidence.

10. A method for tracking personal achievements of an individual, comprising the steps of:
using a personal identification system to warrant identity of the individual, said personal identification system comprising a wearable microchip;
using an achievement tracking system to track achievements of the individual; and
an authority system awarding rewards to the individual using output comprising both: (1) warranted identity of the individual transmitted from said personal identification system; and (2) personal achievements of the individual transmitted from said achievement tracking system,
wherein said output comprises a compiled history loci digitally transmitted in a secure chain of true and accurate data using transaction stamps admissible under the Federal Rules of Evidence,
wherein said achievement tracking system comprises at least one of:
said personal identification system further comprising: using a live chat system to provide witness to an alcohol breath test;
a physical fitness tracking program; and
a financial arrangement tracking program.

11. The method of claim 1, further comprising the steps of:
using said achievement tracking system to track at least one failure of the individual the at least one failure comprising entry into a restricted area, the restricted area comprising at least one of: a playground, a school, and a bar; and
using said authority system to administer punishment for tracked failures of the individual.

12. An apparatus for tracking personal achievements of an individual, comprising:
a personal identification system, comprising a wearable microchip configured to warrant identity of the individual;

an achievement tracking system configured to track achievements of the individual, said achievement tracking system further comprising:
  a kiosk configured for monitoring at least one of:
    presence of an illegal substance; and
    concentration of a controlled substance; and
an authority system configured and authorized to use output of both said personal identification system and said achievement tracking system in disposition of rewards to the individual, said output comprising both: (1) warranted identity of the individual transmitted from said personal identification system; and (2) personal achievements of the individual transmitted from said achievement tracking system,
wherein said output comprises a compiled history log digitally transmitted in a secure chain of true and accurate data admissible under the Federal Rules of Evidence.

13. The apparatus of claim 12, said personal identification system further comprising:
  a bracelet configured for wearing by the individual, said microchip embedded in said bracelet, said bracelet used in warranting presence and proximity of the individual.

14. The apparatus of claim 13, said bracelet further comprising:
  a lock, said lock openable only through use of at least one of a form of a key and destructive force, said bracelet configured for use on a wrist of the individual.

15. The apparatus of claim 13, said achievement tracking system further comprising:
  a receiver, said receiver configured to receive communication from said bracelet,
  a vehicle ignition system configured to operate based upon said communication.

* * * * *